United States Patent
Li et al.

(10) Patent No.: US 9,051,509 B2
(45) Date of Patent: Jun. 9, 2015

(54) SLOW RELEASE BREAKER TREATMENT FLUIDS AND THEIR ASSOCIATED METHODS OF USE

(75) Inventors: Leiming Li, Sugar Land, TX (US); Lijun Lin, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 626 days.

(21) Appl. No.: 13/076,606

(22) Filed: Mar. 31, 2011

(65) Prior Publication Data

US 2012/0247774 A1  Oct. 4, 2012

(51) Int. Cl.
*E21B 43/22* (2006.01)
*E21B 33/13* (2006.01)
*C09K 8/68* (2006.01)
*E21B 43/247* (2006.01)

(52) U.S. Cl.
CPC .............. *C09K 8/685* (2013.01); *E21B 43/247* (2013.01); *C09K 2208/24* (2013.01); *C09K 2208/26* (2013.01)

(58) Field of Classification Search
CPC .. C09K 8/42; C09K 2208/24; C09K 2208/26; C09K 8/685; E21B 43/247
See application file for complete search history.

(56) References Cited

U.S. PATENT DOCUMENTS

| | | |
|---|---|---|
| 3,937,283 A | 2/1976 | Blauer et al. |
| 4,301,868 A | 11/1981 | Scherubel et al. |
| 4,432,882 A | 2/1984 | Raynolds et al. |
| 5,551,516 A | 9/1996 | Norman et al. |
| 5,979,557 A | 11/1999 | Card et al. |
| 6,239,183 B1 | 5/2001 | Farmer et al. |
| 6,435,277 B1 | 8/2002 | Qu et al. |
| 6,506,710 B1 | 1/2003 | Hoey et al. |
| 6,703,352 B2 | 3/2004 | Dahayanake et al. |
| 7,060,661 B2 | 6/2006 | Dobson, Sr. et al. |
| 7,303,018 B2 | 12/2007 | Cawiezel et al. |
| 7,431,087 B2 | 10/2008 | Sullivan et al. |
| 7,510,009 B2 | 3/2009 | Cawiezel et al. |
| 7,721,804 B2 | 5/2010 | Duenckel |
| 7,879,770 B2 | 2/2011 | Lin et al. |
| 2003/0106690 A1* | 6/2003 | Boney et al. .................. 166/280 |
| 2004/0209780 A1 | 10/2004 | Harris et al. |
| 2005/0061502 A1* | 3/2005 | Hanes et al. .................. 166/278 |
| 2008/0176770 A1* | 7/2008 | Sanders et al. ................ 507/213 |
| 2012/0245060 A1* | 9/2012 | Jiang et al. .................... 507/215 |

OTHER PUBLICATIONS

Stimulation Engineering Handbook, John W. Ely, Pennwell Publishing Co., Tulsa, Oklahoma (1994), "Oilfield Applications", Encyclopedia of Polymer Science and Engineering, vol. 10, pp. 328-366 (John Wiley & Sons, Inc. New York, New York, 1987).
Cohen et al., "Quantifying hydrogen peroxide in iron-containing solutions using leuco crystal violet," Geochem. Trans., vol. 6(3) pp. 47-51.

* cited by examiner

*Primary Examiner* — Zakiya W Bates
(74) *Attorney, Agent, or Firm* — Jeremy D. Tillman; Rachel E. Greene; Tim Curington

(57) ABSTRACT

A method of treating a portion of a subterranean formation comprises providing a treatment fluid comprising a carrier fluid, a viscosifying agent, a breaker, and a breaker aid wherein the breaker aid slowly releases a catalyst, wherein the viscosifying agent and the breaker in the carrier fluid have an initial viscosity and the catalyst and the breaker cooperate to decrease the viscosity of the treatment fluid below half of the initial viscosity after at least 30 minutes; and treating the subterranean formation.

20 Claims, 1 Drawing Sheet

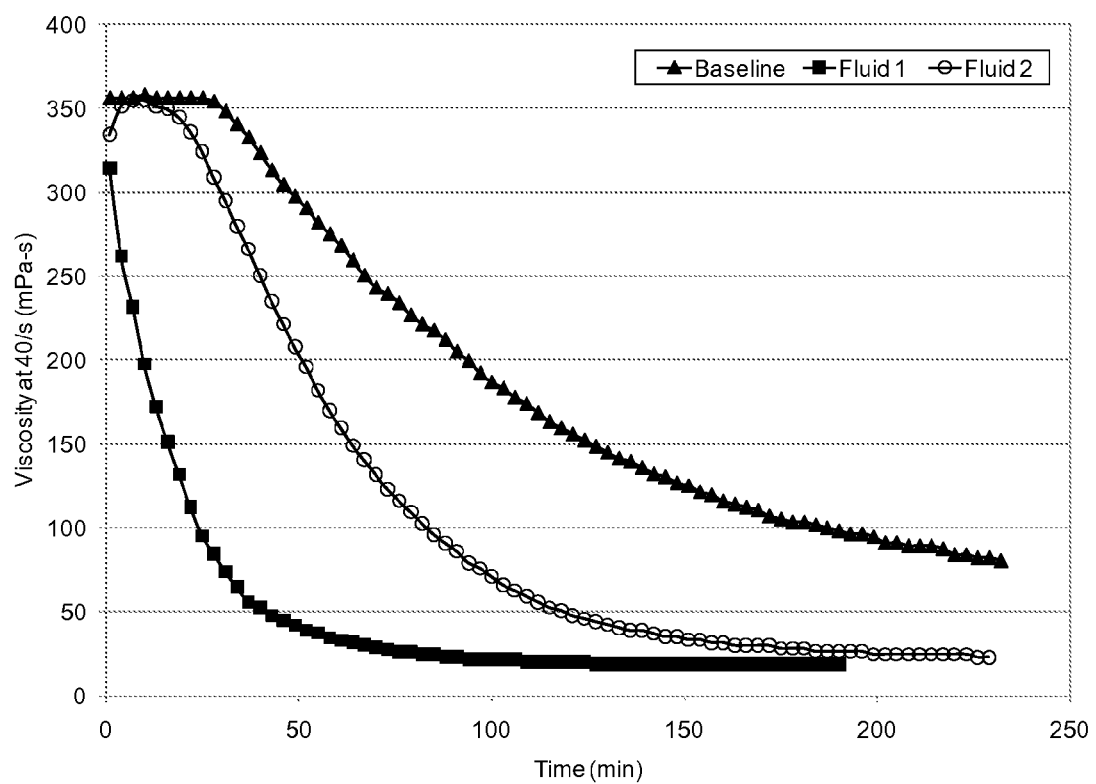

SLOW RELEASE BREAKER TREATMENT FLUIDS AND THEIR ASSOCIATED METHODS OF USE

FIELD OF THE INVENTION

This invention relates generally to composition and method for treating a well penetrating a subterranean formation. More specifically, the invention relates to slow release breaker aid for treatment fluids and associated methods of use.

BACKGROUND

Some statements may merely provide background information related to the present disclosure and may not constitute prior art.

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped or flowed from the well. In many cases the permeability of the formation holding the gas or oil is insufficient for economic recovery of oil and gas. In other cases, during operation of the well, the productivity of the formation drops to the extent that further recovery becomes uneconomical. In such cases, it is necessary to hydraulically fracture the formation and prop the fracture in an open condition by means of a proppant material or propping agent. Such fracturing is usually accomplished by hydraulic pressure, and the proppant material or propping agent is a particulate material, such as sand, resin coated sand or ceramic particles (all of which can be referred to as "proppant"), which are carried into the fracture by means of a fracturing fluid, typically containing high molecular weight polymers, such as guar gum, guar gum derivatives such as hydroxypropyl guar (HPG), carboxymethyl hydroxypropyl G (CMHPG), cellulose, cellulose derivatives such as hydroxyethyl cellulose (HEC), polyvinyl alcohol, biopolymers, such as xanthan gum and diutan gum, which increase the viscosity of the fracturing fluid. The fracturing fluid can also be based on a non-polymeric viscosifier as for example viscoelastic surfactant.

Crosslinking agents can also be added to the fracturing fluid to generate cross-linked gelled fluids so as provide even higher viscosities, better proppant transport properties and to create fracture geometries not possible with other types of fluids. These cross-linked gelled fluids are highly viscous but non-Newtonian and shear thinning permitting them to be easy placed. While the viscous nature of the fluids is important for proppant transport, once the proppant is placed in the fracture it is not desirable for such fluids to remain in the proppant pack as the fluids can significantly hinder the flow of oil or gas in the propped fracture. In recognition of this, the fracturing fluids include "breakers" of various types that are designed to break the chemical bonds and reduce the molecular weight of the polymeric materials in such fracturing fluids after the proppant is placed thus dramatically reducing the viscosity of the fracturing fluid and allowing it to be easily flowed back to the surface from the proppant pack. Such chemical breakers are typically added directly to the fluid. While the breakers are designed to break the chemical bonds and reduce the molecular weight of the polymeric materials in such fluids and significantly lower the viscosity of the fluids, it is important the breakers not reduce the fluid viscosity and transport capability prematurely while the fluid is being pumped. If a premature "break" of the fluid occurs during the fracturing operation, the loss of viscosity will dramatically limit the transport characteristics of the fracturing fluid. If this occurs while pumping, proppant can accumulate near the well bore rather than being carried into the created fracture. Such near well bore accumulation of proppant can lead to an early termination of a fracturing job due to excessive pumping pressure. This early termination is often referred to as a "screen out". Conventional techniques for attempting to avoid an early breaking of the fluid viscosity have included limiting the amount of breaker added to the fracturing fluid and/or encapsulating the breaker with a material that will limit the contact of the breaker with the high molecular weight and/or cross-linked polymers in the fracturing fluid during pumping.

There are also many other applications in which breakers are needed to decrease the viscosity of treatment fluids, such as gravel packing and acidizing fluids, viscosified with polymers or crosslinked polymers or viscoelastic surfactants.

Thus, there are needs for improved compositions and methods of slow release of breaker in treatment fluids.

SUMMARY

In a first aspect a method of treating a portion of a subterranean formation is disclosed. The method comprises providing a treatment fluid comprising a carrier fluid, a viscosifying agent, a breaker, and a breaker aid wherein the breaker aid slowly releases a catalyst wherein the viscosifying agent and the breaker in the carrier fluid have an initial viscosity and the catalyst and the breaker cooperate to decrease the viscosity of the treatment fluid below half of the initial viscosity after at least 30 minutes and treating the subterranean formation.

In a second aspect a method of treating a portion of a subterranean formation is disclosed. The method comprises providing a treatment fluid comprising a carrier fluid, a viscosifying agent, a breaker, and a breaker aid selected from the group consisting of: pyrite ($FeS_2$), chalcopyrite ($CuFeS_2$), magnetite ($Fe_3O_4$), cementite ($Fe_3C$), fayalite ($Fe_2SiO_4$), other iron compounds insoluble or slightly soluble in treatment fluids, chelated iron and mixtures thereof; and treating the subterranean formation.

In third aspect a composition is disclosed. The composition comprises a carrier fluid, a viscosifying agent, a breaker, and a breaker aid selected from the group consisting of: pyrite, chalcopyrite, magnetite, cementite, fayalite, other iron compounds insoluble or slightly soluble in treatment fluids, chelated iron and mixtures thereof

BRIEF DESCRIPTION OF THE DRAWINGS

FIG. 1 shows viscosity profile as a function of time at 66° C. at 40/s shear for the baseline fluid (0.6% diutan and 0.24% ammonium persulfate in water), Fluid 1 (the baseline plus 0.12% ferrous sulfate heptahydrate), and Fluid 2 (the baseline plus 0.12% the pyrite powder), respectively.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the embodiments of the invention and should not be construed as a limitation to the scope and applicability of the invention. While the compositions of the invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

The following definitions are provided in order to aid those skilled in the art in understanding the detailed description of the invention.

The term "fracturing" refers to the process and methods of breaking down a geological formation and creating a fracture, i.e. the rock formation around a well bore, by pumping fluid at very high pressures, in order to increase production rates from a hydrocarbon reservoir. The fracturing methods otherwise use conventional techniques known in the art.

The term "surfactant" refers to a soluble or partially soluble compound that reduces the surface tension of liquids, or reduces interfacial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactant" or "VES" refers to that class of compounds which can form micelles (spherulitic, anisometric, lamellar, or liquid crystal) in the presence of counter ions in aqueous solutions, thereby imparting viscosity to the fluid. Anisometric micelles can be used, as their behavior in solution most closely resembles that of a polymer.

Ferrous sulfate is intended for use with conventional breakers such as ammonium persulfate. In lab tests, when a breaker and a breaker aid are mixed in aqueous media, the breaker releases the oxidizing agent quickly and can break the polymer in a short moment, especially at higher breaker/breaker aid concentrations or at elevated temperatures. The following description provides a breaker aid that releases catalyst slowly into the aqueous media, thus controlling the breaking speed of the breaker in the polymer fluid.

The treatment fluid comprises a carrier fluid, a viscosifying agent, a breaker, and a breaker aid.

The treatment fluid comprises a carrier fluid. The carrier fluid includes any fluid understood in the art, aqueous or non-aqueous. The carrier fluid may be or may include an acid or an emulsified acid. Additionally, the carrier fluid may be brine, and/or may include brine. Also the carrier fluid may be a gas.

In one embodiment, the carrier fluid is foamed or energized fluid. The carrier fluid may contain "foamer", most commonly surfactant or blends of surfactants that facilitate the dispersion of the gas into the first fluid in the form of small bubbles or droplets, and confer stability to the dispersion by retarding the coalescence or recombination of such bubbles or droplets. Foamed and energized fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value. The gas or the foam gas may be air, carbon dioxide, supercritical carbon dioxide, or nitrogen.

The treatment fluid comprises a viscosifying agent or thickener. In one embodiment, the viscosifying agent includes but is not limited to diutan gum, starches, welan gum, guar gum, HPG, CMHPG, xanthan gum, carboxymethylcellulose, alginate, methylcellulose, tragacanth gum and karaya gum.

According to some embodiments, the viscosifying agent may be a polysaccharide such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds.

According to some embodiments, the viscosifying agent may be a synthetic polymer such as polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

According to some embodiments, the viscosifying agent may be a cellulose derivative such as hydroxyethylcellulose (HEC) or hydroxypropylcellulose (HPC), carboxymethylhydroxyethylcellulose (CMHEC) and carboxymethycellulose (CMC).

According to some embodiments, the viscosifying agent may be a biopolymer such as xanthan, diutan, and scleroglucan.

According to some embodiments, the viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. Nos. 6,435,277 (Qu et al.) and 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids.

When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. In some embodiments, a zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

$$R_1N^+(R_2)(R_3)(R_4) X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

According to some embodiments, the viscosifying agent may be an associative polymer for which viscosity properties are enhanced by suitable surfactants and hydrophobically modified polymers. For example, it may be a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al.

The viscosifying agent is combined with the carrier fluid in an amount between about 0.001% to about 5% by weight, or between about 0.01% to about 4% by weight, or between about 0.1% to about 2.5% by weight.

The breaker may be any conventional breaker used: oxidizers, proteins, enzymes, pH modifiers, metal chelators, metal complexors, polymer hydrolysis enhancers, and micelle disturbing substances. Breakers reduce the polymer's molecular weight by the action of an acid, an oxidizer, an enzyme, or some combination of these on the polymer itself.

When an oxidizing salt, such as a bromate salt, is combined with a source of bisulfite ions, such as sodium bisulfite or metabisulfite (MBS), the breaking system thus produced is an excellent oxidizing agent for polymers. The breaker may be an oxidizer such as ammonium, lithium, sodium or potassium bromate salt that serves as an oxidizing agent for degrading the polymer. The breaking systems described herein have application to other oxidizing breakers, such as inorganic oxidizers and organic peroxides (e.g. salts of chlorite, and persulfate or benzoyl peroxide). Thus, where bromate breakers are discussed it should be understood that other oxidizers could also be used and have equal application. Because bromate breakers require particularly high activating temperatures, however, it was of particular interest to find a suitable activator that would allow the bromate breaker to be used at lower temperatures. In some embodiments, the breaking agent may be a bromate breaking agent, a chlorite breaking agent, a peroxide breaking agent, a perborate breaking agent, a percarbonate breaking agent, a perphosphate breaking agent, or a persulfate breaking agent.

Suitable oxidizing agents include peroxysulfuric acid; persulfates such as ammonium persulfate, sodium persulfate, and potassium persulfate; peroxides such as hydrogen peroxide, t-butylhydroperoxide, methyl ethyl ketone peroxide, cumene hydroperoxide, benzoyl peroxide, acetone peroxide, methyl ethyl ketone peroxide, 2,2-bis(tert-butylperoxy)butane, pinane hydroperoxide, bis[1-(tert-butylperoxy)-1-methylethyl]benzene, 2,5-bis(tert-butylperoxy)-2,5-dimethylhexane, tert-butyl peroxide, tert-butyl peroxybenzoate, lauroyl peroxide, and dicumyl peroxide; bromates such as sodium bromate and potassium bromate; iodates such as sodium iodate and potassium iodate; periodates such as sodium periodate and potassium periodate; permanganates such as potassium permanganate; chlorites such as sodium chlorite; hyperchlorites such as sodium hyperchlorite; peresters such as tert-butyl peracetate; peracids such as peracetic acid; azo compounds such as azobisisobutyronitrile (AIBN), 2,2'-azobis(2-methylpropionitrile), 1,1'-azobis(cyclohexanecarbonitrile), 4,4'-azobis(4-cyanovaleric acid), and, for example, those sold under the VAZO trade mark by DuPont such as Vazo® 52, Vazo® 64, Vazo® 67, Vazo® 88, Vazo® 56 WSP, Vazo® 56 WSW, and Vazo® 68 WSP; perborates such as sodium perborate; percarbonates; and perphosphates.

Oxidizer may be particularly suitable internal breakers as for example disclosed in U.S. Pat. No. 7,879,770, hereby incorporated by reference.

Suitable enzyme breakers include, but are not necessarily limited to, hemi-cellulases, such as galactosidase and mannosidase hydrolases; cellulases; pectinases; alpha-amylases, and even undefined enzyme breakers and mixtures thereof derived from bacterial extracts that function in the method of this invention, and mixtures thereof. Specific, but non-limiting examples of suitable enzymes include GAMMANASE 1.0L hemicellulase from Novozymes, MULTIFECT GC cellulase from Genencor International, PECTINEX® ULTRA SPL pectinase from Novozymes, SPEZYME FRED alpha-amylase from Biocat, Inc., and PLEXGEL 10L available from Chemplex. The enzyme breakers may have an activity in the pH range from about 2 to about 11; preferably from about 5 to about 10, and are effective to attack the specific galactomannan linkages in the galactomannan-based crosslinked polymer gel. In the case where the borate crosslinked polymer is a guar or guar-based polymer, the enzyme may be effective to break 1,4-β-D-mannosidic linkages and/or the 1,6-a-D-glactomannosidic linkages.

Enzymes and/or proteins may be particularly suitable internal breakers as for example disclosed in U.S. Pat. No. 7,431,087, hereby incorporated by reference.

Many proteins may be used, provided that their secondary, tertiary or quaternary structures can be altered (for example, denatured) by the conditions (for example, pH, temperature, salinity, solvent, or pressure) that the VES fluid will experience. A denatured protein is one which has lost its functional conformation. Once denatured, a protein loses most, if not all of its biological activity. It is in this non biologically functional form, that the protein may act as an effective breaker for VES fluids. A protein may be denatured through various means including exposure to extremes of heat, pH, salt concentration, denaturing agents like urea/guanidine chloride, and exposure to certain detergents. The denatured proteins work as effective breakers for VES fluids at various conditions and with varying degrees of delay, for example as a function of the pH, temperature, salinity, pressure and molecular composition of the protein. Many different proteins are effective: i) Fibrous proteins such as the cytoskeletal proteins, for example Tubulin, Actin, Keratin, and Myosin; and the extracellular matrix proteins, for example Collagen, Elastin and Reelin; ii) Globular proteins such as the plasma proteins, for example Albumin, and Serum Amyloid; and coagulation factors, for example Fibrin and Thrombin; and hemoproteins, for example Hemoglobin and Myoglobin; and hormones, for example Oxytocin and Insulin; and DNA-binding proteins, for example the Histones; and immune system proteins for example Immunoglobins; iii) Catalytic proteins, for example enzymes, may also be used in the Invention.

The Enzyme Commission number (EC number) is a well-known numerical classification scheme for enzymes, developed by the International Union of Biochemistry and Molecular Biology; it is based on the chemical reactions the enzymes catalyze. As a system of enzyme nomenclature, every EC number is associated with a recommended name for the respective enzyme. Every enzyme code consists of the letters "EC" followed by four numbers separated by periods. Those numbers represent a progressively finer classification of the enzyme. The main types of enzymes that may be used are those in groups EC-1 through EC-6. These groups are: EC 1: Oxidoreductases such as Dehydrogenases, Oxidases, Luciferases, and Reductases; EC 2: Transferases such as Transaminases, and Kinases; EC 3: Hydrolases such as Lipases, Amylases, Peptidases, and Glucosidases; EC 4: Lyases; EC 5: Isomerases; and EC 6: Ligases. Strictly speaking, these EC numbers do not specify enzymes, but enzyme-catalyzed reactions. When different enzymes (for instance from different organisms) catalyze the same reaction, then they receive the same EC number. We intend that the above list of EC numbers represents all of the enzymes that fall within the indicated classes and that catalyze the indicated reactions.

Various types of bases and acid may be used as a breaker. Breakers may include oxyacids and oxyanions of chlorine, for example, hypochlorous acid and hypochlorites, chlorous acid and chlorites, chloric acid and chlorates, and perchloric acid and perchlorate. Examples include calcined magnesium oxide and tetraethylenepentamine. Examples of alkaline pH modifiers that can be used to cause emulsion destabilization include alkali metal hydroxides, oxides, phosphates, carbonates and bicarbonates; in a particular embodiment, the breaker is sodium carbonate or ammonium bicarbonate; alkaline earth oxides, phosphates, and carbonates; ammonium hydroxide, ammonium carbonate, and ammonium bicarbonate; alkali metal silicates, and base precursors such as ureas and substituted ureas, cyanates, alkylamines and certain alkanolamines, quaternary ammonium salts, ammonium salts and salts of a weak acid and a strong base, among others.

In some embodiments to further delay the break, breakers may be encapsulated in, for example, fatty acids, polyvinyl alcohol, synthetic resins such as epoxy resins, phenolic resins, acrylate polymers and copolymers, and polylactic acid and polyglycolic acid polymers and copolymers. The solubility and/or the porosity of the coating dictate the time dependent release of the breaker. The coating is used to delay the release of the breaker. The coating thickness and type are chosen as a function of the conditions (temperature, pressure, pH and required time delay) for the application of the fluid in the oilfield. The breaker may be released by diffusion through the coating prior to its complete dissolution, or may be released after dissolution, depending upon the effective radius of the breaker and the changing porosity of the coating the during dissolution process.

The breaker aid may be an iron compound that releases iron slowly in fluids at low pH or high pH environment and/or at appropriate temperatures. The breaker aid may include $FeS_2$ (pyrite), $CuFeS_2$ (chalcopyrite), $Fe_3O_4$ (magnetite), iron carbide (cementite), $Fe_2SiO_4$ (fayalite), etc . . . Compounds like $Fe_2O_3$ or FeO may quickly react with acid (low pH) and release Fe ions fast as the catalyst for breakers, and therefore may not be used in low-pH fluids as the slow-release breaker aid.

The breaker aid may be an iron chelate, such as EDTA-chelated iron.

The breaker and the breaker aid may be used in the treatment fluid in an amount from greater than 0 to about 200% or more by weight of the polymer in the treatment fluid. In certain applications, the breaker and the breaker aid may be used in an amount of from about 4% to about 100%, more particularly from about 8% to about 80%, and even more particularly from about 10% to about 50% by weight of the polymer in the treatment fluid. The amount of breaker versus the breaker aid is at a ratio between about 10:1 and about 1:10, or at a ratio of 1:1.

In some embodiments, it may be desired to foam or energize the treatment fluid using a gas, such as air, nitrogen, carbon dioxide, or combined. The treatment fluid therefore further comprises a foaming agent to increase the gelled oil's tendency to foam. A foaming agent is usually a surfactant that, typically present in small amounts, facilitates the formation of a foam, or enhances its stability by inhibiting the coalescence of bubbles. The foaming agent can be organopolysiloxanes such as those described in U.S. Pat. No. 4,301,868. The preferred organo functional groups in the organopolysiloxanes include alkyl and more preferably methyl. The foaming agent can also be fluorocarbon polymers/surfactants such as those described in U.S. Pat. No. 4,432,882.

The treatment fluid may further comprise proppant materials. The selection of a proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, or pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The fluid may also contain other enhancers or additives.

Any additives normally used in treatment fluid can be included, again provided that they are compatible with the other components and the desired results of the treatment. Such additives can include, but are not limited to anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

In one aspect, the treatment method is used for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, New York, 1987) and references cited therein, the disclosures of which are incorporated herein by reference thereto.

To facilitate a better understanding, the following examples of embodiments are given. In no way should the following examples be read to limit, or define, the scope of the invention.

EXAMPLES

Some tests were conducted to show the properties of the treatment fluid disclosed herewith.

In the following example, $FeS_2$ (pyrite) powder was used as the slow-release breaker aid. The pyrite was from Zacatecas, Mexico (sold by Ward's Natural Science). The pyrite was ground to powder, and filtered through a 100-mesh sieve, and then through a 120-mesh sieve. The pyrite powder between 100-mesh (0.15 mm) and 120-mesh (0.125 mm) was collected for use as the slow-release breaker aid.

Diutan gum at a loading of 0.6% (by weight, same below unless otherwise indicated) was fully hydrated in water, and the fluid had a pH of 7.08. Ammonium persulfate was then added and dissolved in the diutan fluid at a dose of 0.24%. Ammonium persulfate reacted very slowly, if any, with diutan at room temperature (about 70 deg F.). This was the baseline fluid (i.e., 0.6% diutan and 0.24% ammonium persulfate in water). The viscosity of the baseline fluid was tested at 150 deg F. (66 deg C.) with a Fann50-type viscometer at a shear rate of 40/s, shown in FIG. 1.

A commonly used breaker aid, ferrous sulfate heptahydrate ($FeSO_4$—$7H_2O$) was added to the baseline fluid at a dose of 0.12% (defined as Fluid 1). The ferrous sulfate heptahydrate quickly dissolved in the fluid. The viscosity of the fluid was similarly tested with the viscometer at 150 deg F. (66 deg C.) as shown in FIG. 1. The breaking reaction was relatively quick, with an obvious drop in the initial viscosity when compared with the baseline fluid.

The pyrite powder ($FeS_2$, between 100-mesh and 120-mesh) was added to the baseline fluid at a dose of 0.12% (defined as Fluid 2). The viscosity of the fluid was similarly tested with the viscometer at 150 deg F. (shown in FIG. 1). The viscosity of Fluid 2 decreased much more slowly than that of Fluid 1, as the $FeS_2$ particles released iron ions (the breaker aid) more slowly than Fluid 1. On the other hand, the viscosity of Fluid 2 decreased faster than that of the baseline fluid, suggesting that the pyrite particles did act as the (slow-release) breaker aid.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a portion of a subterranean formation comprising:
   providing a treatment fluid comprising a carrier fluid, a viscosifying agent, a breaker, and a breaker aid wherein the breaker aid slowly releases a catalyst, wherein
   the breaker aid is selected from the group consisting of pyrite ($FeS_2$), chalcopyrite ($CuFeS_2$), magnetite ($Fe_3O_4$), cementite ($Fe_3C$), and fayalite ($Fe_2SiO_4$,
   the viscosifying agent and the breaker in the carrier fluid have an initial viscosity and the catalyst and the breaker cooperate to decrease the viscosity of the treatment fluid below half of the initial viscosity after at least 30 minutes; and
   treating the subterranean formation,
   wherein the catalyst is an iron compound.

2. The method of claim 1, wherein the viscosifying agent is selected from the group consisting of substituted galactomannans, guar gums, high-molecular weight polysaccharides composed of mannose and galactose sugars, guar derivatives, hydroxypropyl guar (HPG), carboxymethylhydroxypropyl guar (CMHPG) and carboxymethyl guar (CMG), hydrophobically modified guars, guar-containing compounds, hydroxyethylcellulose (HEC), hydroxypropylcellulose (HPC), carboxymethylhydroxyethylcellulose (CMHEC), carboxymethycellulose (CMC), xanthan, diutan, scleroglucan and mixtures thereof.

3. The method of claim 1, wherein the viscosifying agent is viscoelastic surfactant.

4. The method of claim 1, wherein the breaker is selected from the group consisting of oxidizers, proteins, enzymes, pH modifiers, metal chelators, metal complexors, polymer hydrolysis enhancers, micelle disturbing substances, and mixtures thereof.

5. The method of claim 1, wherein the catalyst and the breaker cooperate to decrease the viscosity of the treatment fluid below half of the initial viscosity after at least 50 minutes.

6. The method of claim 1, further comprising the step of fracturing the subterranean formation.

7. The method of claim 1, wherein the breaker aid is pyrite ($FeS_2$).

8. The method of claim 1, wherein the breaker aid is chalcopyrite ($CuFeS_2$).

9. The method of claim 1, wherein the breaker aid is magnetite ($Fe_3O_4$)

10. The method of claim 1, wherein the breaker aid is cementite ($Fe_3C$).

11. A method of treating a portion of a subterranean formation comprising:
providing a treatment fluid comprising a carrier fluid, a viscosifying agent, a breaker, and a breaker aid selected from the group consisting of: pyrite ($FeS_2$), chalcopyrite ($CuFeS_2$), magnetite ($Fe_3O_4$), cementite ($Fe_3C$), and fayalite ($Fe_2SiO_4$); and
treating the subterranean formation.

12. The method of claim 11, wherein the viscosifying agent is selected from the group consisting of substituted galactomannans, guar gums, high-molecular weight polysaccharides composed of mannose and galactose sugars, guar derivatives, hydroxypropyl guar (HPG), carboxymethylhydroxypropyl guar (CMHPG) and carboxymethyl guar (CMG), hydrophobically modified guars, guar-containing compounds, hydroxyethylcellulose (HEC), hydroxypropylcellulose (HPC), carboxymethylhydroxyethylcellulose (CMHEC), carboxymethycellulose (CMC), xanthan, diutan, scleroglucan and mixtures thereof.

13. The method of claim 11, wherein the viscosifying agent is viscoelastic surfactant.

14. The method of claim 11, wherein the breaker is selected from the group consisting of oxidizers, proteins, enzymes, pH modifiers, metal chelators, metal complexors, polymer hydrolysis enhancers, micelle disturbing substances, and mixtures thereof.

15. The method of claim 11, further comprising the step of fracturing the subterranean formation.

16. The method of claim 11, further comprising the step of treating the subterranean formation at a temperature above 20 degrees Celsius.

17. A treatment fluid comprising a carrier fluid, a viscosifying agent, a breaker, and a breaker aid selected from the group consisting of: pyrite ($FeS_2$), chalcopyrite ($CuFeS_2$), magnetite ($Fe_3O_4$), cementite ($Fe_3C$), and fayalite ($Fe_2SiO_4$).

18. The treatment fluid of claim 17, wherein the viscosifying agent is selected from the group consisting of substituted galactomannans, guar gums, high-molecular weight polysaccharides composed of mannose and galactose sugars, guar derivatives, hydroxypropyl guar (HPG), carboxymethylhydroxypropyl guar (CMHPG) and carboxymethyl guar (CMG), hydrophobically modified guars, guar-containing compounds, hydroxyethylcellulose (HEC), hydroxypropylcellulose (HPC), carboxymethylhydroxyethylcellulose (CMHEC), carboxymethycellulose (CMC), xanthan, diutan, scleroglucan and mixtures thereof.

19. The treatment fluid of claim 17, wherein the viscosifying agent is viscoelastic surfactant.

20. The treatment fluid of claim 17, wherein the breaker is selected from the group consisting of oxidizers, proteins, enzymes, pH modifiers, metal chelators, metal complexors, polymer hydrolysis enhancers, micelle disturbing substances, and mixtures thereof.

\* \* \* \* \*